(12) United States Patent
Wang (10) Patent No.: US 6,718,084 B1
(45) Date of Patent: Apr. 6, 2004

(54) INTEGRATED OPTICAL LINE CARD PROTECTION MODULE

(75) Inventor: Xiaomei Wang, Winchester, MA (US)

(73) Assignee: Axsun Technologies, Inc., Billerica, MA (US)

( * ) Notice: Subject to any disclaimer, the term of this patent is extended or adjusted under 35 U.S.C. 154(b) by 163 days.

(21) Appl. No.: 09/852,931

(22) Filed: May 10, 2001

(51) Int. Cl.[7] .................................................. G02B 6/26
(52) U.S. Cl. ........................................................ 385/17
(58) Field of Search ............................. 385/14, 15, 16, 385/17, 24

(56) References Cited

U.S. PATENT DOCUMENTS

| | | | |
|---|---|---|---|
| 6,097,860 A | * 8/2000 | Laor | 385/17 |
| 6,212,309 B1 | 4/2001 | Nguyen et al. | 385/17 |
| 6,337,760 B1 | * 1/2002 | Huibers et al. | 359/291 |
| 6,445,841 B1 | * 9/2002 | Gloeckner et al. | 385/17 |
| 6,453,083 B1 | * 9/2002 | Husain et al. | 385/17 |

FOREIGN PATENT DOCUMENTS

| | | | |
|---|---|---|---|
| EP | 1037492 A2 | 9/2000 | H04Q/11/00 |
| WO | 87/01818 | 3/1987 | G02B/6/34 |
| WO | 01/01725 A1 | 1/2001 | H04Q/11/00 |
| WO | 01/09653 A1 | 2/2001 | G02B/6/26 |

* cited by examiner

Primary Examiner—Tulsidas C. Patel
(74) Attorney, Agent, or Firm—J. Grant Houston (57) ABSTRACT

An integrated optical line card protection module uses free-space optical links to thereby increase the level of integration while decreasing footprint. The module comprises a bench, a user-side interface to an array of user fibers and a device-side interface to an array of device fibers. The device fibers connect the module to a primary device and a redundant device. A monitoring signal generator is provided on the bench that provides monitoring signals. A monitoring signal detector is also on the bench that detects the monitoring signals. Finally, a beam switching system is provided that selectively connects the user fibers to the device fibers of the primary device or the device fibers of the redundant device. The preferred configuration is in-line with the user-side interface on an opposed side of the module relative to the device side interface. This is accomplished with translating switching system.

15 Claims, 12 Drawing Sheets

INTEGRATED OPTICAL LINE CARD PROTECTION MODULE

BACKGROUND OF THE INVENTION

Large optical cross-connect systems are used to switch optical signals between fiber links without conversion into the electrical domain. These systems are useful for dynamic capacity allocation and network recovery, for example.

The optical cross-connect switch systems are implemented on a variety of platforms. Presently, microelectromechanical systems (MEMS)-based switches using tilt mirror arrays are being pursued by a number of entities. The individual mirrors are used to couple light exiting from one user fiber link into another user fiber link.

One issue surrounding the deployment of these optical cross-connect switch systems concerns robustness. The switch fabrics are large. This makes it difficult to maintain the requirement that every path or connection through the fabric be operational at all times. For example, it is not uncommon for a few of the individual tilt mirrors in an array to become non-operational. This will have the effect of removing potential connections.

One solution to this problem relies on the use of redundant switch fabrics. If the connection is not possible between two user fibers with the primary switch fabric, the connection is made with the redundant switch fabric.

In order to switch between the primary and redundant systems, line card modules are used in conjunction with these switching systems. They have the capability of directing the optical signal from a user fiber either to the primary or redundant system. More generally, such line card protection modules are used in other applications where the ability to switch an optical signal between two systems is required, such as between primary and redundant rings in a SONET system.

In a common line card implementation, an optical signal from a user fiber is received at an input port of the protector module and switched between two output fiber links. Typically, a tap is provided to monitor the input signal. A two-by-two (2×2) switch is provided to route the input signal in addition to a monitoring signal from one of the switching systems to a monitoring diode.

Signals from the primary and redundant systems are handled by a second 2×2 switch. Specifically, the signal from either the primary or the redundant system is connected to another user fiber at an output port of the module. The other system is connected to a laser diode to thereby probe the operation of the primary or redundant system that is not currently in use with the monitoring signal. Typically, a monitoring port is used to detect the output from this laser. Similarly, another tap is provided to detect the signal that is transmitted to the output port.

SUMMARY OF THE INVENTION

In the past, line card protection modules have been offered with only relatively low levels of integration. Moreover, the interconnections, such as signal taps, were provided through fiber couplers. These factors made the modules large and expense to manufacture.

The present invention is directed to an integrated optical line card protection module. It is notable in that it uses free-space optical links to thereby increase the level of integration while decreasing footprint.

In general, according to one aspect, the invention features an optical line card protection module. The module comprises a bench, a user-side interface to an array of user fibers, i.e., the fibers that carry optical signals to and from another system, and a device-side interface to an array of device fibers, i.e., the fibers that carry optical signals to and from the primary and redundant devices, for example. A monitoring signal generator is provided on the bench that provides monitoring signals. A monitoring signal detector is also on the bench that detects the monitoring signals. Finally, a beam switching system is provided that selectively connects the user fibers to the device fibers of the primary device or the device fibers of the redundant device.

In one embodiment, the user-side interface and the device-side interface comprise separate fiber mounting blocks for respectively mounting the endfaces of the user fibers and the endfaces of the device fibers to the bench. Further, a user-side lens array is preferably secured to the bench between the fiber endfaces of the user fibers and the beam switching system. This facilitates coupling of the optical signals between the beam switching system and the user fibers. Device-side lens array is also preferably secured to the bench between the fiber endfaces of the device fibers and the beam switching system.

In the current embodiment, the monitoring signal generator comprises at least one semiconductor device that is mounted on the bench. It can be a semiconductor laser or a light emitting diode. A generator lens array directs the monitoring signals from the semiconductor device to the beam switching system. In the present implementation, the beam switching system enables output beams to the user-side interface to be transmitted past the beam switching system in a first state and translates the beam in a second state. This allows the user fibers for the primary and redundant device to be arranged parallel to each other, providing an in-line system. In one implementation, the beam switching system comprises opposed tilt mirror arrays.

In general, according to another aspect, the line card protection module comprises user input signal tap detector arrays and/or user output signal tap detector arrays. These are located in the beam path between the user-side interface and the beam switching system to detect optical signals that are being transmitted between the user fibers and the beam switching system.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
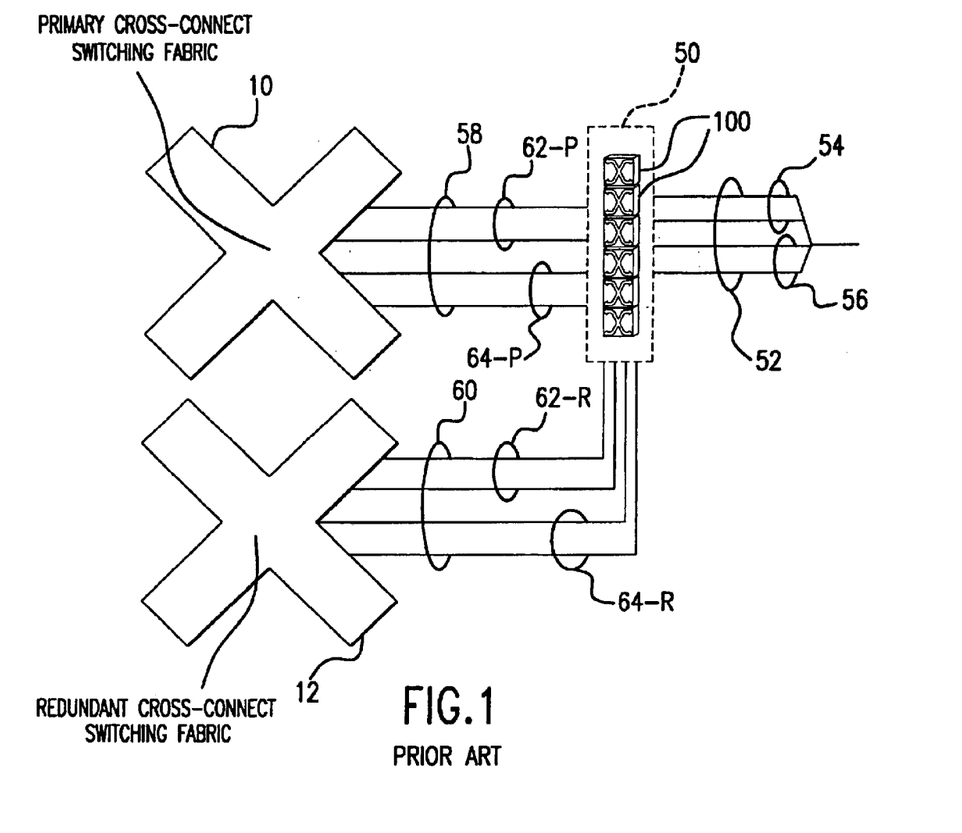
FIG. 1 is a schematic diagram illustrating a prior art optical line card system installed between the user fibers and the primary/redundant devices.

FIG. 1 illustrates an application for an optical line card protection system 50. Specifically, the protection system receives a number of user fibers 52. These fibers include user input fibers 54 and user output fibers 56.

The optical signals from the user fibers 54 are selectively connected to either a primary device 10 or a redundant device 12. In one application, the primary and redundant devices are cross-connect switching fabrics. Separate arrays of device fibers 58, 60 connect the protection system 50 to the primary and redundant devices 10, 12, respectively. Each of the device fiber arrays 58, 60 includes input fibers 62 and device output fibers 64.

In the typical implementation, the protection system 50 is divided into separate modules 100, which, depending on their level of integration, handle one or multiple ones of the user fibers 52.

Figure 2A:
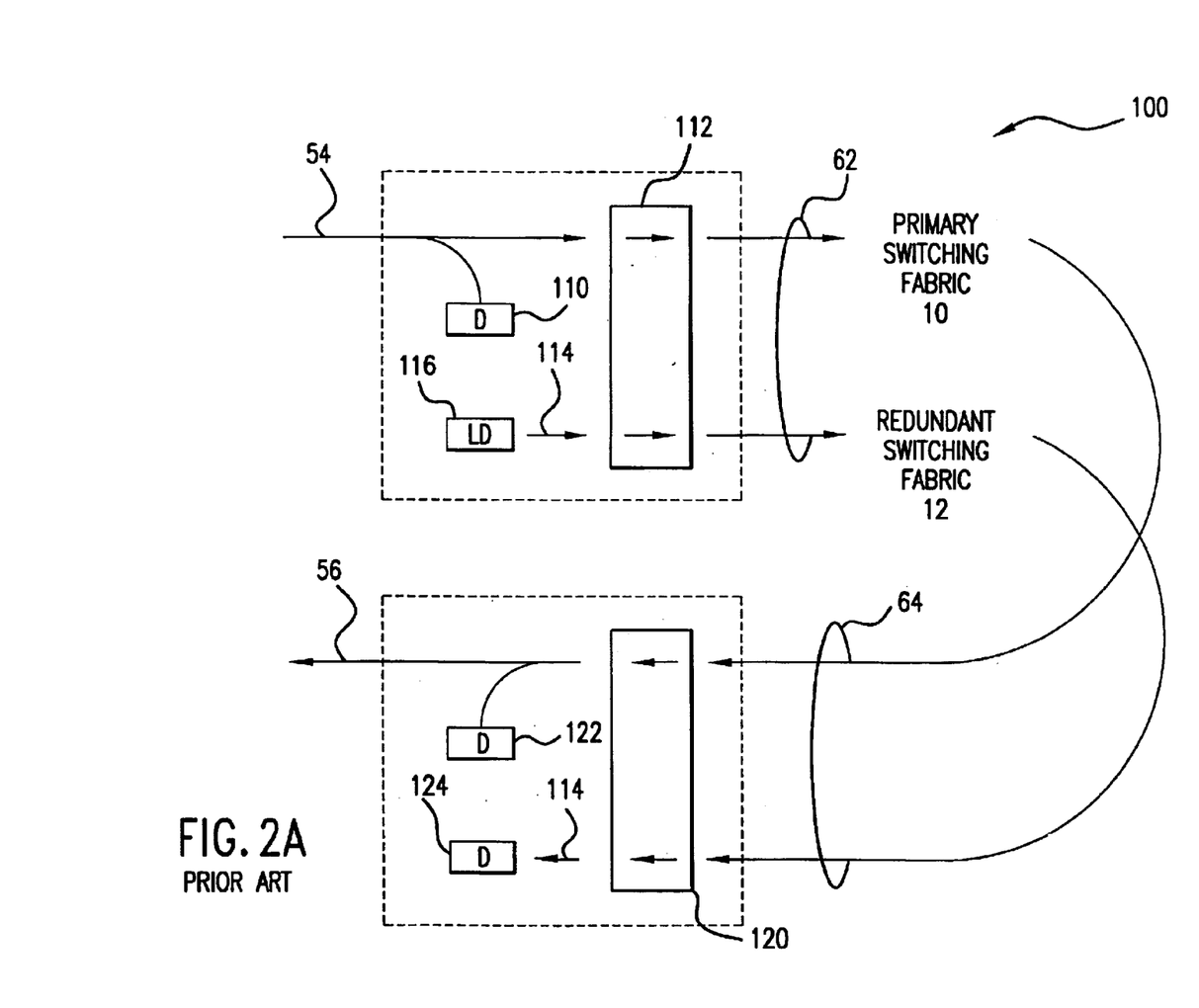
FIG. 2A is a schematic diagram of a prior art optical line card protection module showing the optical signal routing with the switching system in a first state.

FIG. 2A illustrates the operation of an optical line card protection module 100 that handles one user input fiber 54 and one user output fiber 56. In this illustration, the module's switching system is in a first state. Typically, the optical signal is received on the user input fiber 54 and is detected by a detector 110. The remainder of the signal goes to a two-by-two switch 112. In the illustrated state, the two-by-two switch 112 transfers the optical signal on the user input fiber to the primary switching fabric 10. In parallel, a monitoring signal 114, generated by a laser diode 116, is connected by the two-by-two switch 112 to the redundant switching fabric 12. This occurs via the device input fibers 62.

The device output fibers 64 from the primary and redundant switching fabrics 10, 12 are received at a second two-by-two switch 120. The optical signal from the primary switching fabric 10 is coupled to the user output fiber 56 while a detector 122 monitors the level of that signal. Simultaneously, the second two-by-two switch 120 couples the monitoring signal from the redundant switching fabric 12 to a detector 124.

Figure 2B:
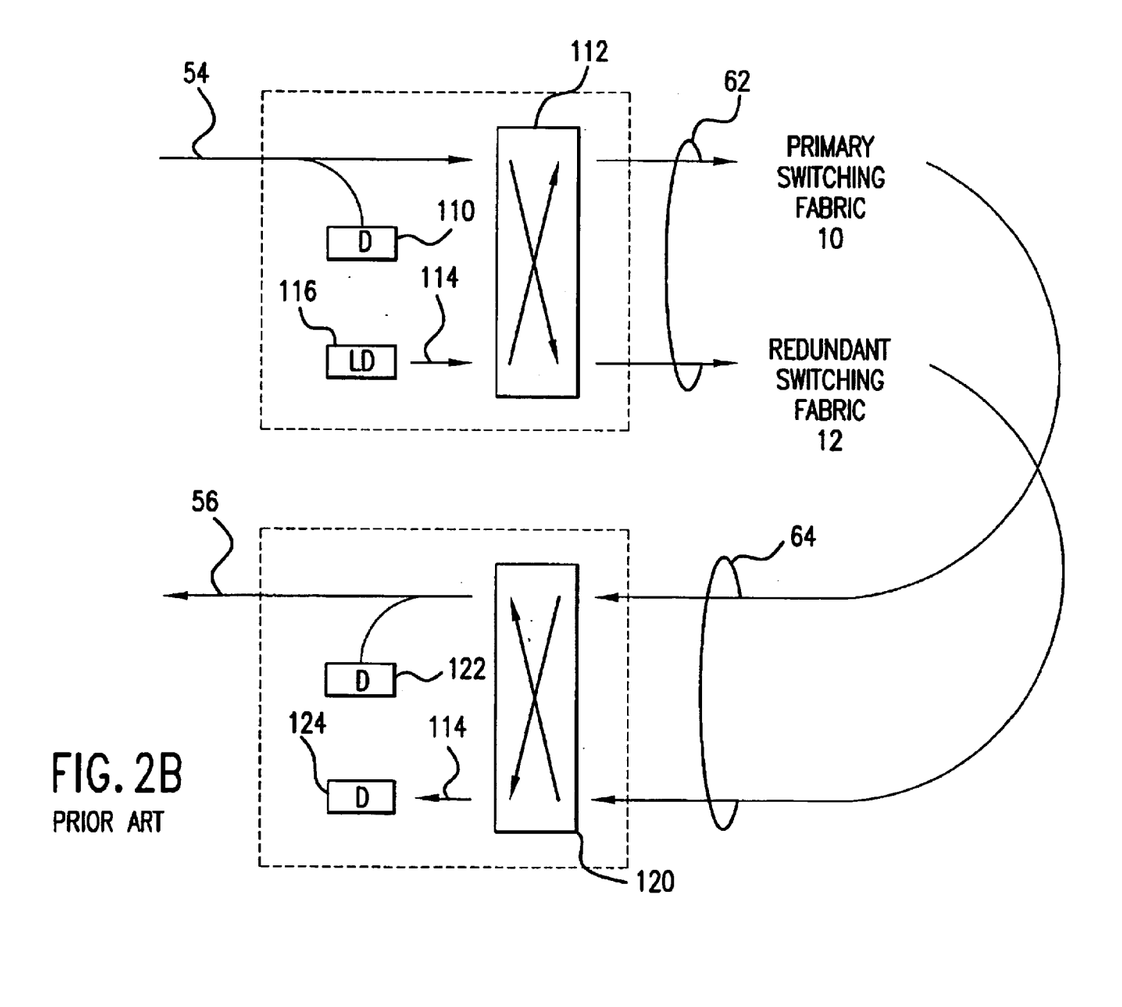
FIG. 2B is a schematic diagram of the prior art optical line card protection module with the switching system in a second state.

FIG. 2B shows the operation of the optical line card protection module 100 with the switching system in a second state. In operation, the first and second two-by-two switches 112, 120 are simultaneously converted to the second state so that the signal from the user fiber 54 is handled by the redundant switching fabric 12, while the operation of the primary switching fabric 10 is monitored.

Figure 3:
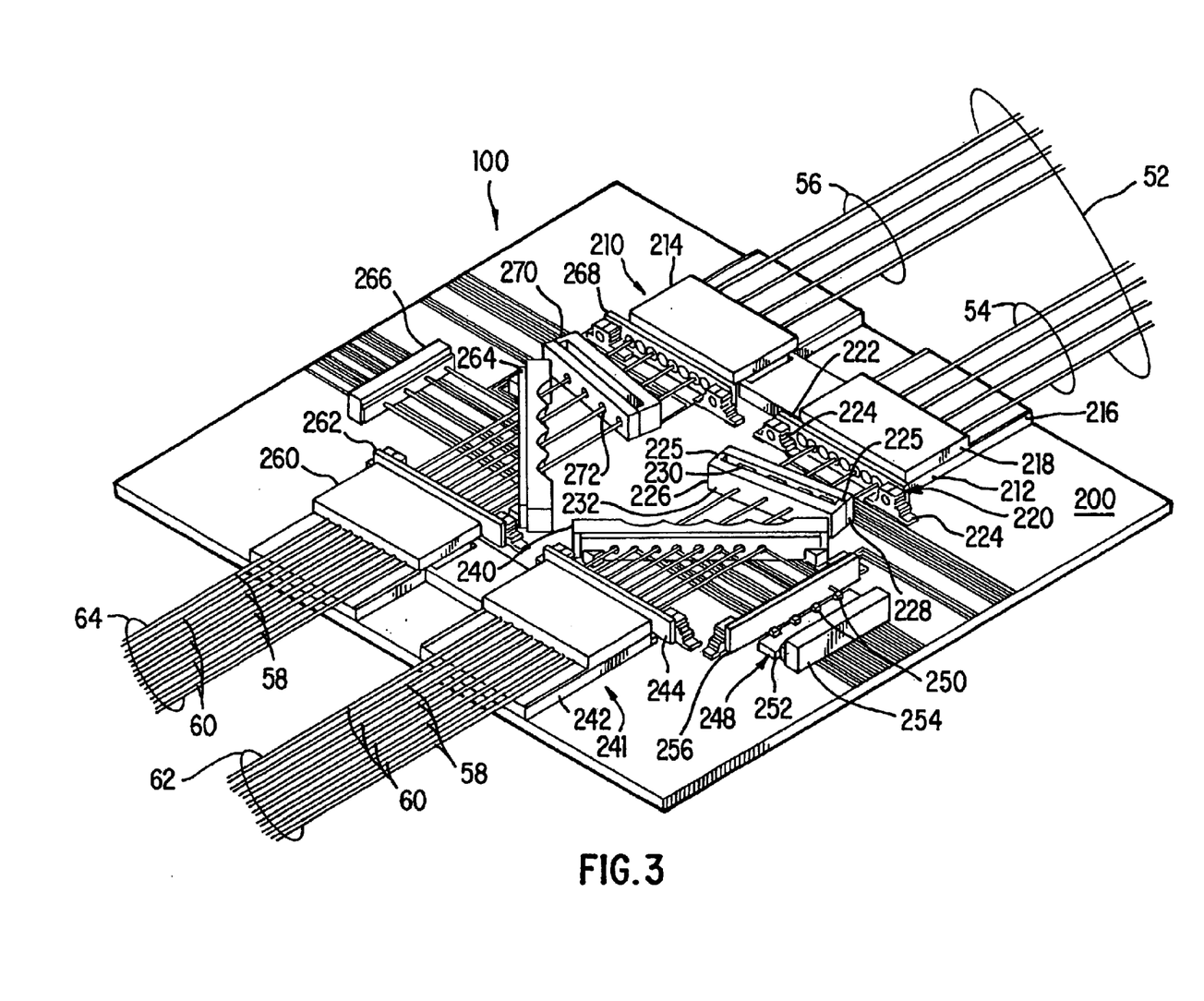
FIG. 3 is a perspective view of an integrated optical line card protection module of the present invention.

FIG. 3 illustrates an integrated optical line card protection module 100, which has been constructed according to the principles of the present invention. The illustrated embodiment has the capability of handling a total of eight user fibers 52 including four user input fibers 54 and four user output fibers 56. These fibers transmit the optical signals between the module and the user systems.

In more detail, starting the input side of the module 100, the user fibers 52 are received at a user-side fiber interface 210. This user-side fiber interface 210, in the current implementation, comprises a user input fiber mounting block 212 and a user output fiber mounting block 214. These blocks can be permanently attached within the hermetic package or alternatively implemented as plug-in devices, in other implementations.

The illustrated mounting blocks in the module 100 each currently comprise a lower portion 216 and an upper portion 218. The fibers are held in opposed V-grooves in these upper and lower portions 218, 216.

The mounting blocks hold endfaces of the user fibers in a secure relationship to the bench 200. Specifically, in the case of the user input fibers 54, beams exiting from these interfaces pass through a user input collimating lens array 220.

Currently, the lens arrays of the module each comprise a lens substrate 222, which is secured to the bench 200 via deformable mounting structures 224. These deformable example, and then aligned through the deformation of the mounting structures 224 to micrometer to submicrometer accuracy.

The input beams are next transmitted through a user input tap array 226, which samples the beams to determined their respective intensities.

In the present implementation, the tap arrays of the module 100 each comprise a detector substrate 228 on which discrete photodetectors 230 have been mounted. With reference to the user output tap array 270, in the preferred embodiment, backside optical ports 272 are provided through the detector substrate 228 to reduce insertion loss and avoid the need to anti-reflection (AR) coat the detector substrate. A beam splitting substrate 232 reflects a portion of the beam to be sampled by the detectors 230. The beam splitting substrate is separated for the detector substrate 228 by stand-offs 225 to create a gap. In the preferred embodiment, the beam splitting substrate 232 and more generally the tap array is angled with respect to the optical axis defined by the input beams. This angling displaces the reflected beam relative to the incoming beam through the optical port to enable detection by a respective one of the detectors that is adjacent to the optical port.

The input signals are next transmitted to four two-by-two input-side switches 240 of the module's beam switching system. Input-side switch 240 selectively routes the input signals to either the primary or redundant device via the device input fibers 62, which are secured to the bench 200 via a device input fiber mounting block 242 of the device-side fiber interface 241. A device input focusing lens array 244 is provided to couple the signals into the device input fibers 62. These device input fibers transmit the optical signals to the devices. In the illustrated embodiment, the device-side fiber interface 241 is implemented as blocks located within the hermetic boundary of the module, although a plug system could also be used.

In the illustrated implementation, the primary device fibers 58 and the redundant device fibers 60 are interleaved with respect to each other in the device input fiber array 62.

A monitoring signal generator 248 is also provided. In the present implementation, this generator comprises multiple monitoring signal laser diodes 250, which are commonly mounted on a laser diode pedestal 252. To monitor the intensity of the generated monitoring signals, a laser diode detector array 254 is provided to detect rear facet light from these laser diodes 250.

In contrast, the front facet light from the monitoring signal laser diodes 250 is collimated by a generator collimating lens array 256. These monitoring signals are coupled into the device input fibers 62 by the four two-by-two device input-side switches 240.

Turning now to the output side of the module 100, the device output fibers 64 from devices 10 and 12 are received by a device output fiber mounting block 260, which is part of the device-side fiber interface 241 and holds the corresponding fiber endfaces in a secure relationship with the bench 200. These device output fibers 64 transmit the optical signals from the devices.

The signals emitted from the device output fiber endfaces are transmitted through a device output collimating lens array 262, to four two-by-two output-side switches 264 of the beam switching system. These four two-by-two switches 264 selectively direct the device signals to either a monitoring signal detector array 266 or the fiber endfaces of a user output fiber mounting block 214 for the user output fibers 56. A user output focusing lens array 268 is provided to improve the coupling of these signals into the user output fibers. A user output tap array 270 is provided to detect the magnitude of these signals.

Figure 4:
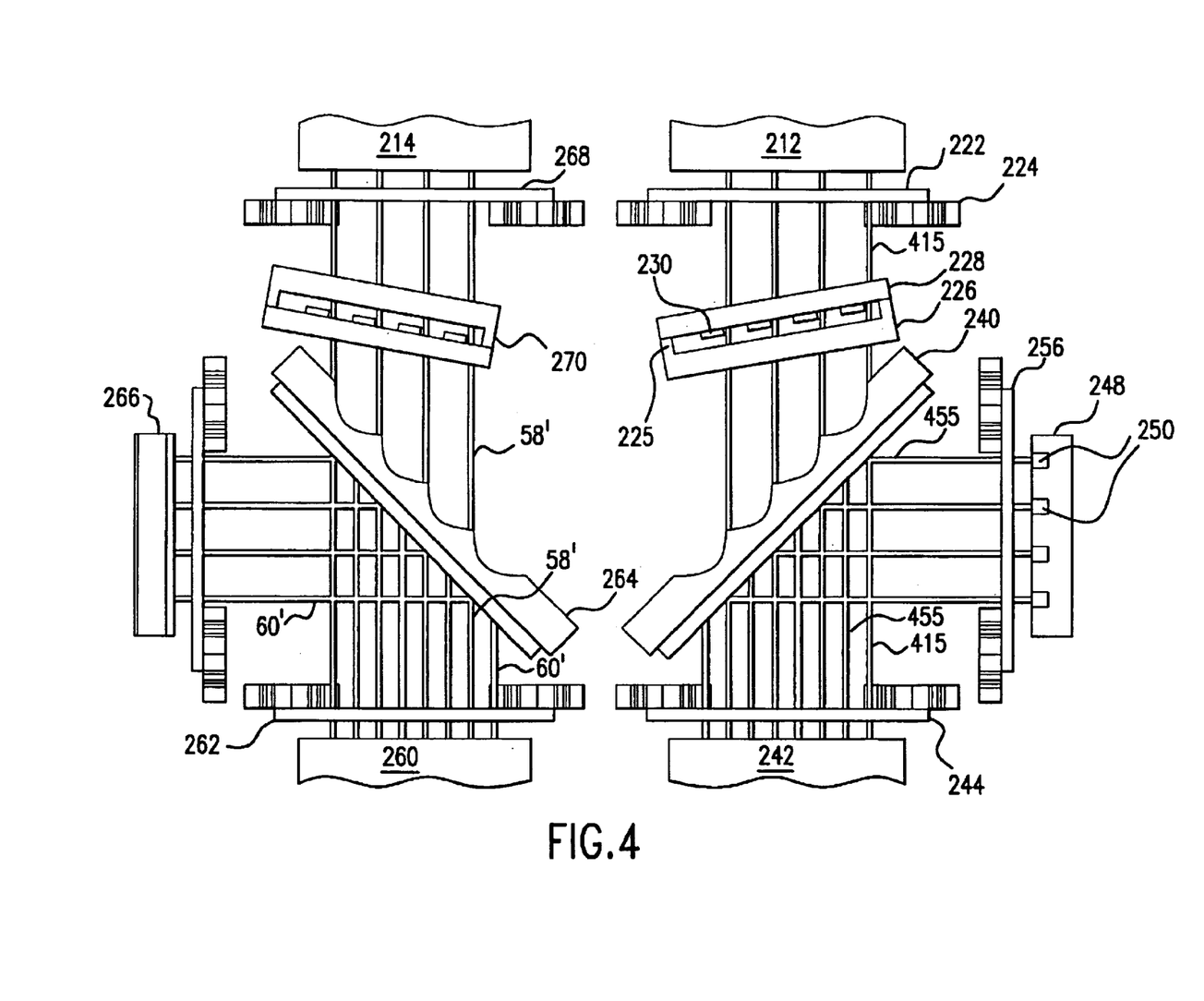
FIG. 4 is a plan view of the free-space interconnect in the optical line card protection module with the switching system in a first state.

FIG. 4 illustrates the operation of the switches 240, 264. For example, on the input side, when the switches are in the first state, input beam 415, for example, passes directly through the input-side switch 240 to a primary device fiber 58 in the device input fiber array 62. Monitoring signals 455, for example, is reflected and thus directed to a fiber endface of the redundant device fibers 60 in device input fiber mounting block 242.

On the output side, output-side switch 264 receives a primary device beam 58' sourcing from a primary device fiber 58 and a redundant device beam 60' sourcing from a redundant device fiber 60. In the illustrated first state, the redundant device beam 60' is reflected and thereby directed to the monitoring signal detector array 266. In contrast, the primary device beam 58' passes directly through the output-side switch 264.

Figure 5:
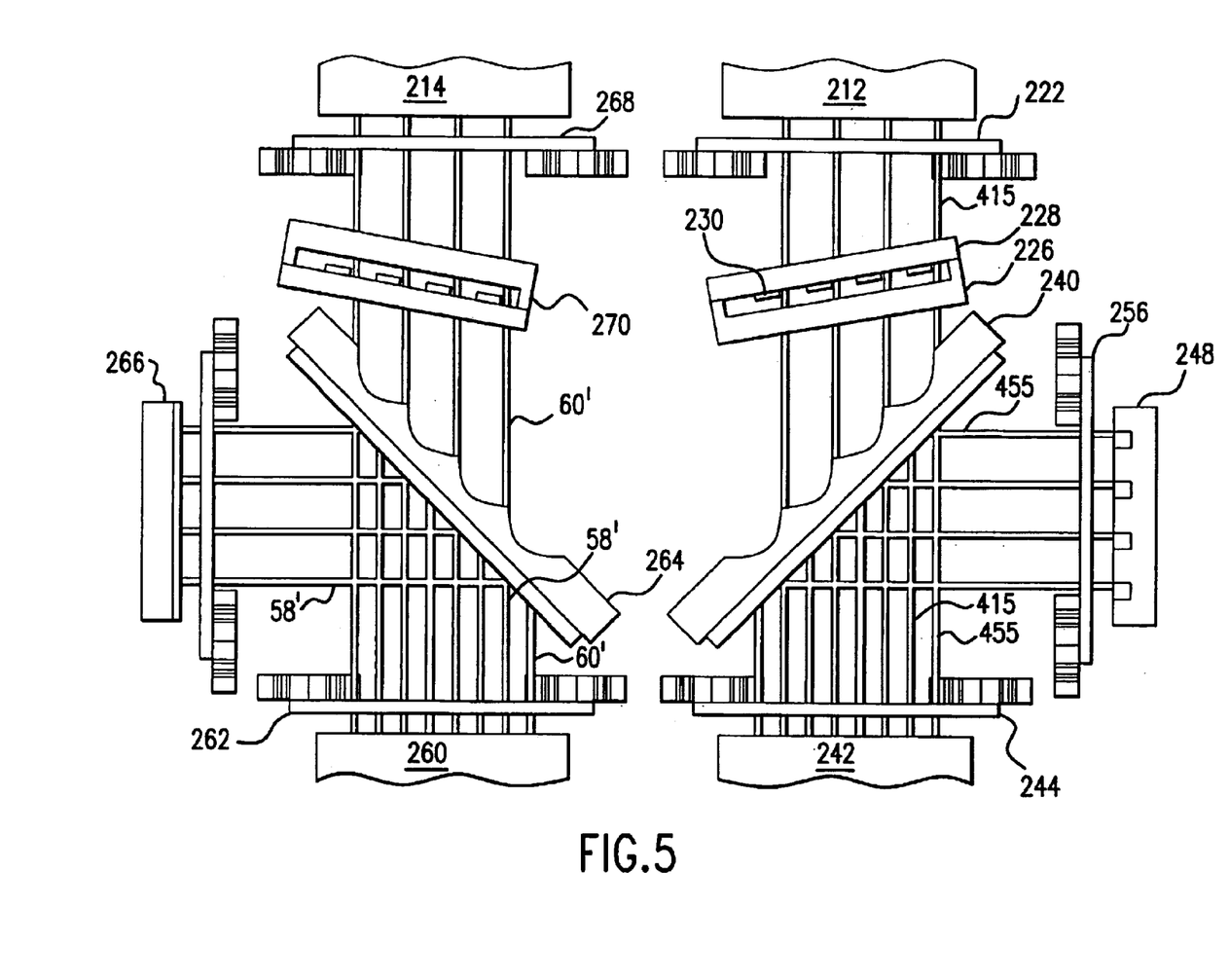
FIG. 5 illustrates the line card protection module free space interconnect with the switching system in a second state.

Referring to FIG. 5, when the input-side four two-by-two switches 240 are in the second state, the input beam 415 is translated, allowing the signals to be coupled into redundant device fiber 60 in the device input fiber array 62. In contrast, the monitoring signal beam 455 is reflected such that it is coupled into a primary device fiber 58.

Similarly, when the output-side four two-by-two switches 264 are in the second state, the primary device beam 58' reflected and thereby directed to the monitoring signal detector array 266. The redundant device beam 60' passes through but is shifted by output-side switch 264.

Figure 6:
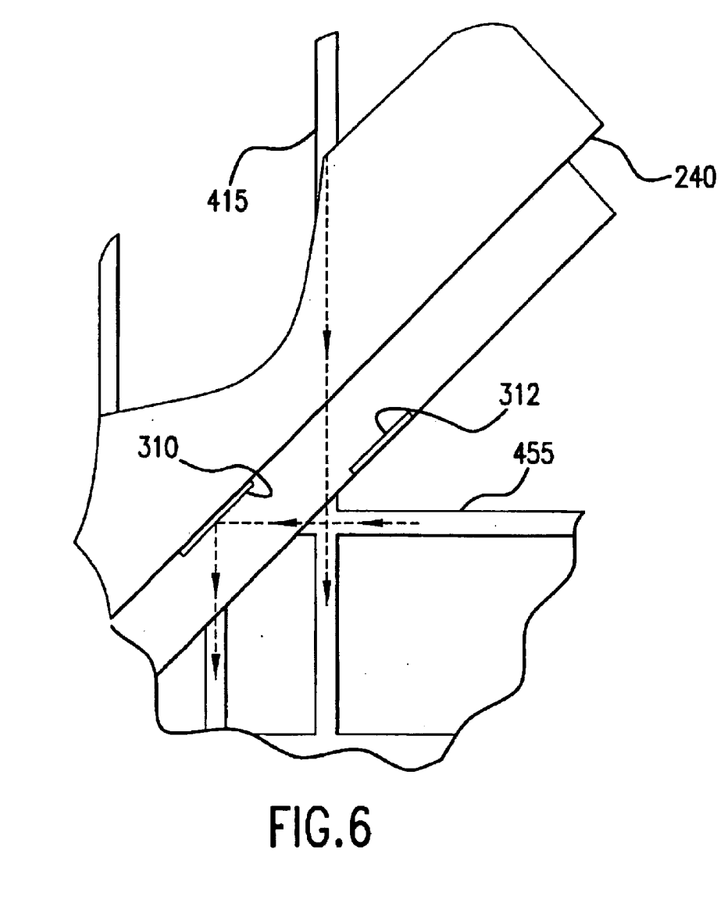
FIG. 6 is a detailed view of a switching system in the first state.
Figure 7:
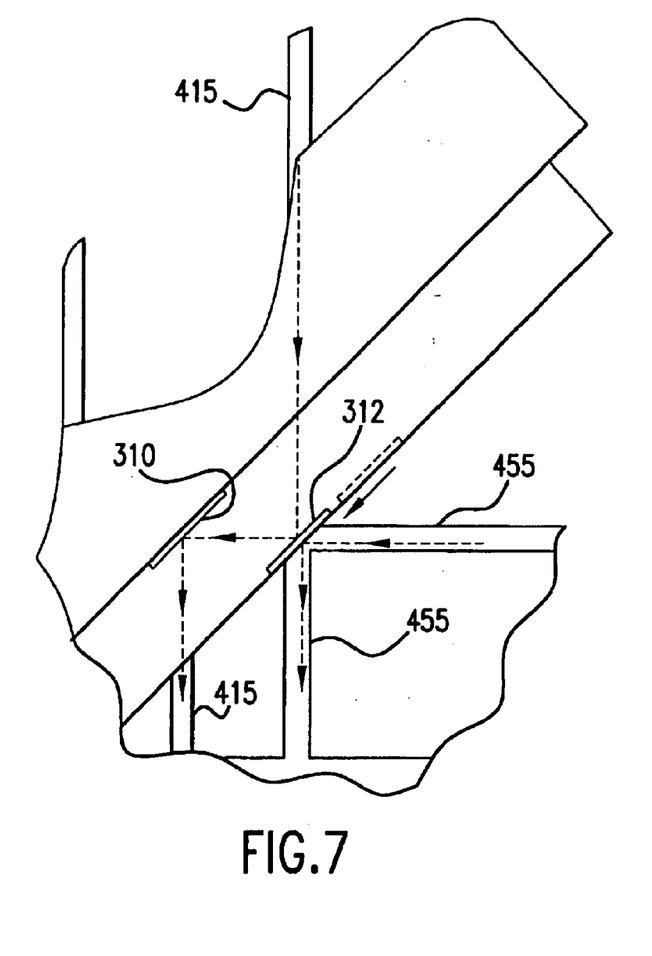
FIG. 7 is a detailed view of the switching system in a second state.

FIG. 6 shows the operation of the input-side switch 240 in more detail. Specifically, monitoring signal 455 is reflected off a stationary reflector 310. Input beam 415 passes directly through switch 240 typically through optical ports that are formed in the switch. In contrast, when switch 240 is in its second state is illustrated by FIG. 7, movable or displaceable reflector 312 is moved into the beam path to redirect the monitoring beam 455 to traverse the path of the input beam 415 when the switch is in the first state to the primary device fiber 58. The backside of the displaceable reflector 312 redirects the input beam 415 to be reflected off reflector 310, which then directs the beam to the redundant device fiber 60.

The operation of the four two-by-two device output switches 264 is similar to the device input switch 240. In FIG. 4, the primary device signal 58' from the primary device passes directly through the switch 264. The redundant device signal 60' from the redundant device is reflected to the detector 266. In FIG. 5, the signals 58' from the primary device are reflected by switch 264 to detector 266. The signals 60' from the redundant device are displaced and passed user output fibers.

Note that the operation of module 100 as describe above shows the input-side switch 240 and the output-side switch 264 of the beam switching system operating in a ganged mode. That is, each beam switch of the two arrays of four two-by-two switches converts between a first state and a second state at the same time. This is not, however, necessarily the typical mode of operation. For example, only the beam switches corresponding to the same channel though the primary and redundant devices can be switched together. For example, the beam switch in the input-side switch 240 associated with a first one of the user input fibers is switched with the beam switch in the output-side switch 264 associated with the first one of the user output fibers. More generally, the control circuitry associated with module 100 enables independent control of each of the beam switches in the arrays of switches 240 and 264, in the preferred embodiment.

Figure 8:
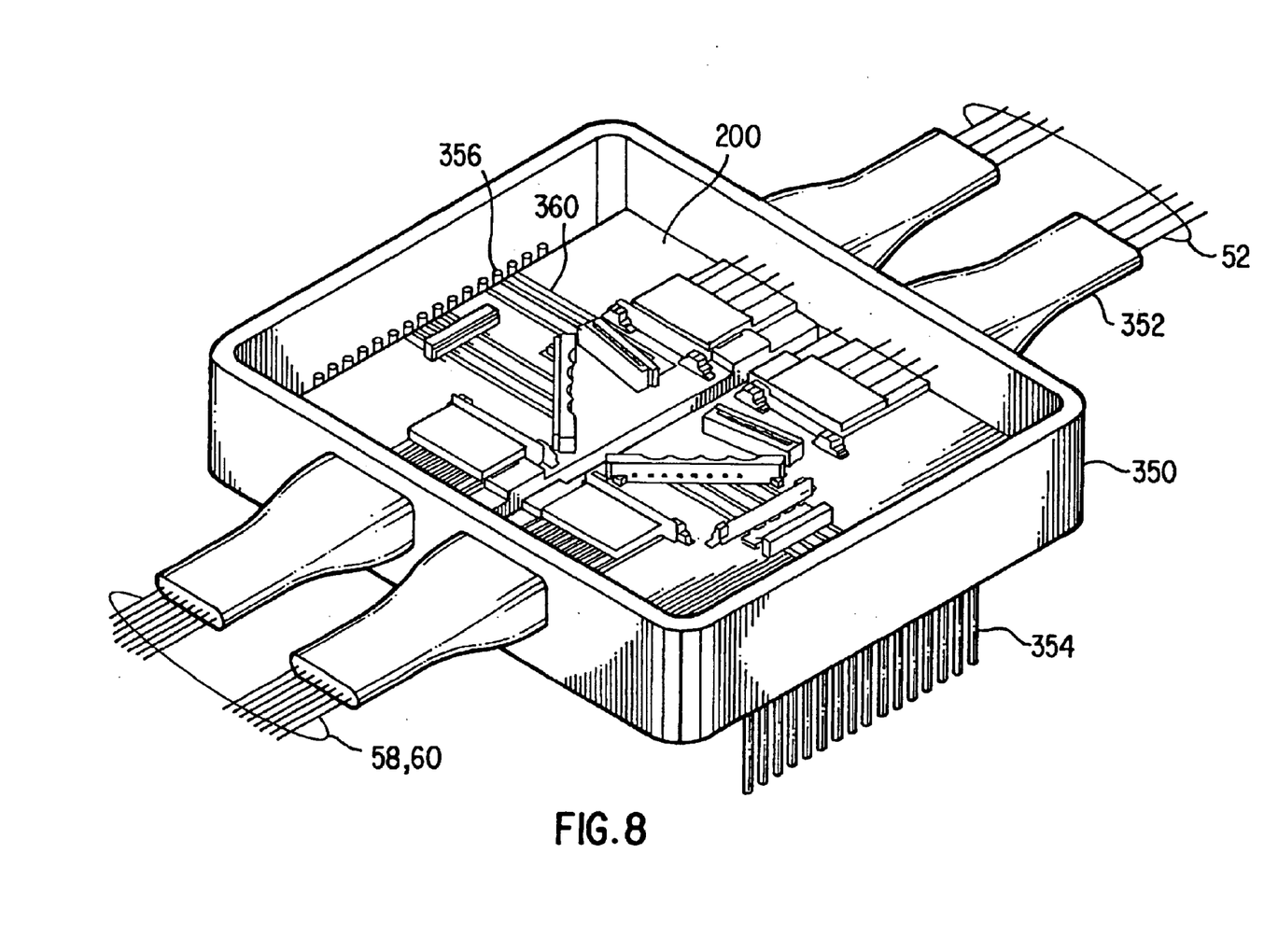
FIG. 8 is a perspective view of the optical line card protection module in a hermetic package prior to lid seal.

FIG. 8 illustrates the installation of the optical bench 200 into a hermetic package 350. Further provided are boots 352 to protect the user and device fibers 52, 58, 60. Electrical pins 354 are further provided to the outside of the hermetic package. These connect to bond pins 356, which are electrically connected to the traces 360 on the bench 200 typically via a wire bonding operation to provide electrical control of the electronic devices on the bench 200.

Figure 9:
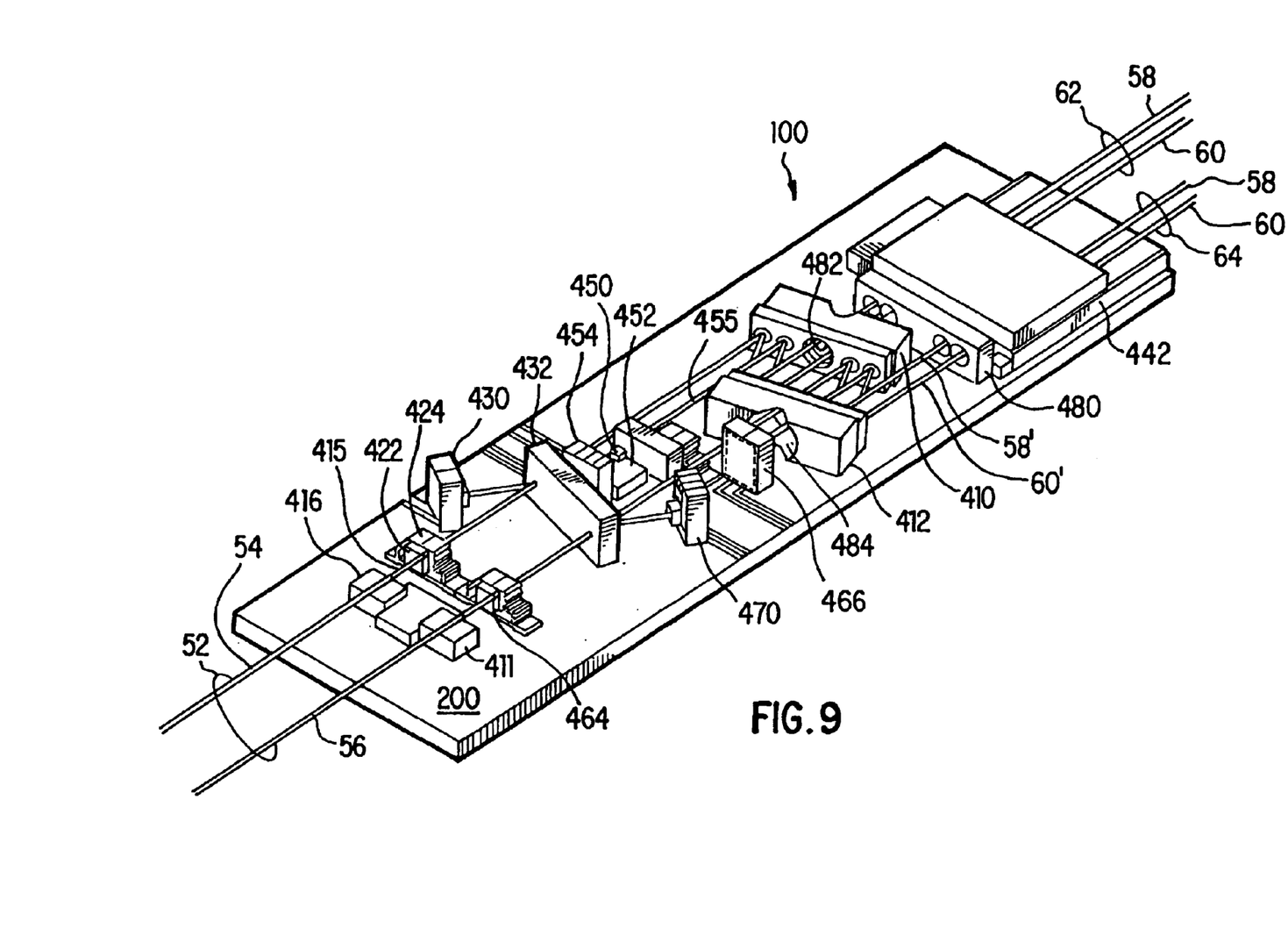
FIG. 9 is a perspective view of an optical line card protection module according to a second embodiment of the present invention.

FIG. 9 illustrates a second embodiment of the optical line card protection module 100. It provides a lower level of integration only handling two user fibers 52. In this example, the beam switching system is implemented with two proposed tilt mirror arrays 410, 412.

In more detail, user input fiber 54 is secured to the optical bench 200 via a user input fiber mounting block 416. The input beam 415 is collimated by a user input collimating lens substrate 422, which that is held on a deformable mounting structure 424. An angled beam splitting substrate 432 reflects part of this input beam 415 to a detector 430. The remainder of the beam is passed to the two opposed tilt mirror arrays 410, 412.

Also provided is a monitoring signal generator. Specifically, monitoring signal laser diode 450 is installed on laser diode pedestal 452. The monitoring signal beam 455 is also received by the beam switching system. Laser diode detector 454 detects rear facet light from the laser diode 450

The monitoring signal beam 455 and the input beam 415 are transmitted through optical port 482 into the device input fibers 62 of either the primary device 58 or the redundant device 60, which are held in device-side fiber mounting block 442 via the focusing/collimating lens array 480.

The output fibers 64 for the primary and redundant device 58, 60 are also received at mounting block 442. Specifically, the device output beam from the primary device 58' and for the redundant device 60' are collimated by the lens array 480 and beam switched by the opposed tilt mirror array 410, 412. Specifically, the beams pass through the port 484 through the backside of beam tilt mirror array 412 to be transmitted either 1) through the beam splitter 432 and into user output fiber 56, which is held to the bench 200 by block 411; or 2) to detector 466. Focusing lens 464, held on a mounting structure, focuses the beam into the fiber endface of fiber 56. Detector 470 samples the portion of the beam provided by beam splitter 432.

Figure 10:
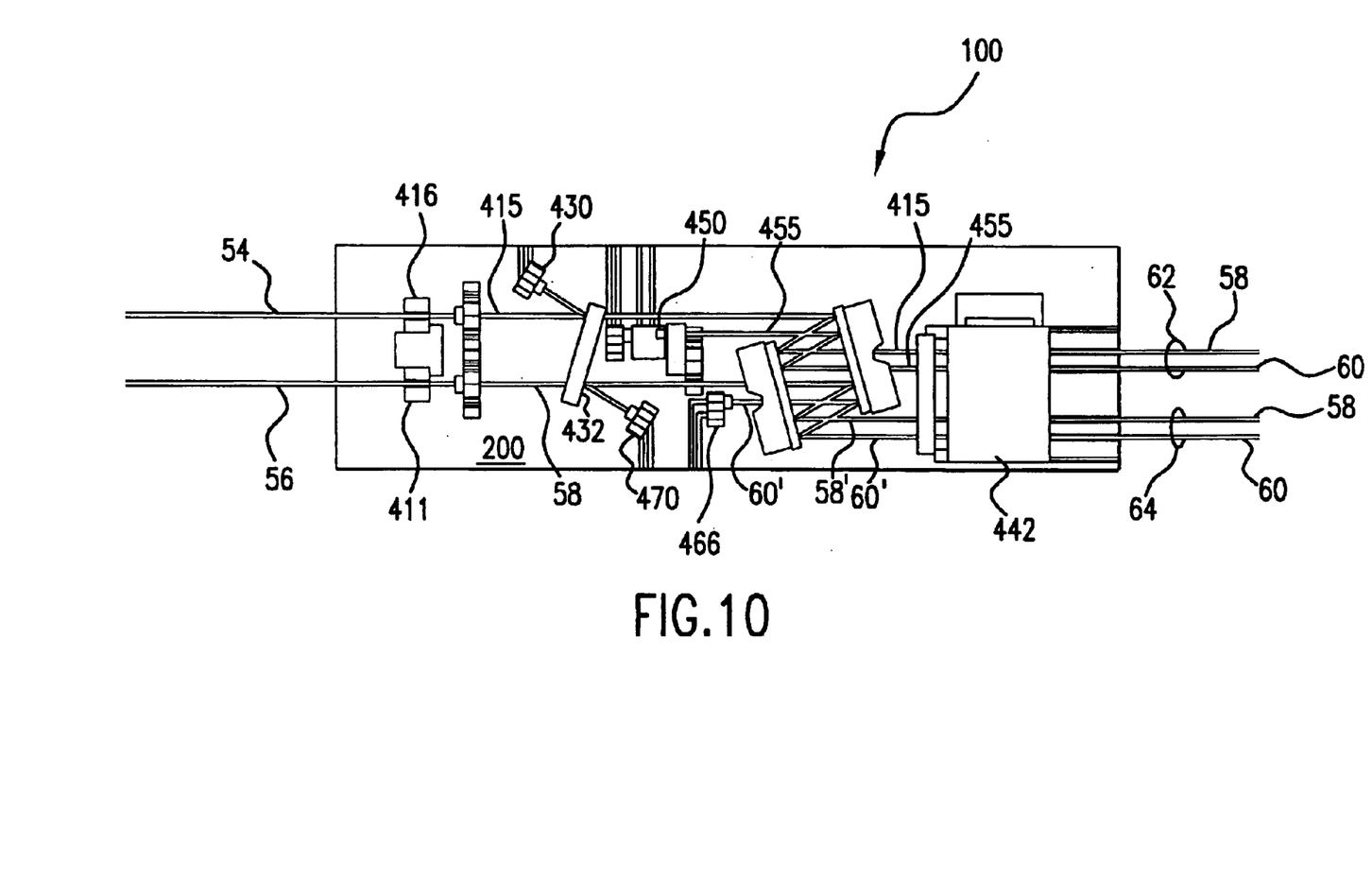
FIG. 10 is a top view of the second embodiment optical line card protection module with the switching system in a first state.
Figure 11:
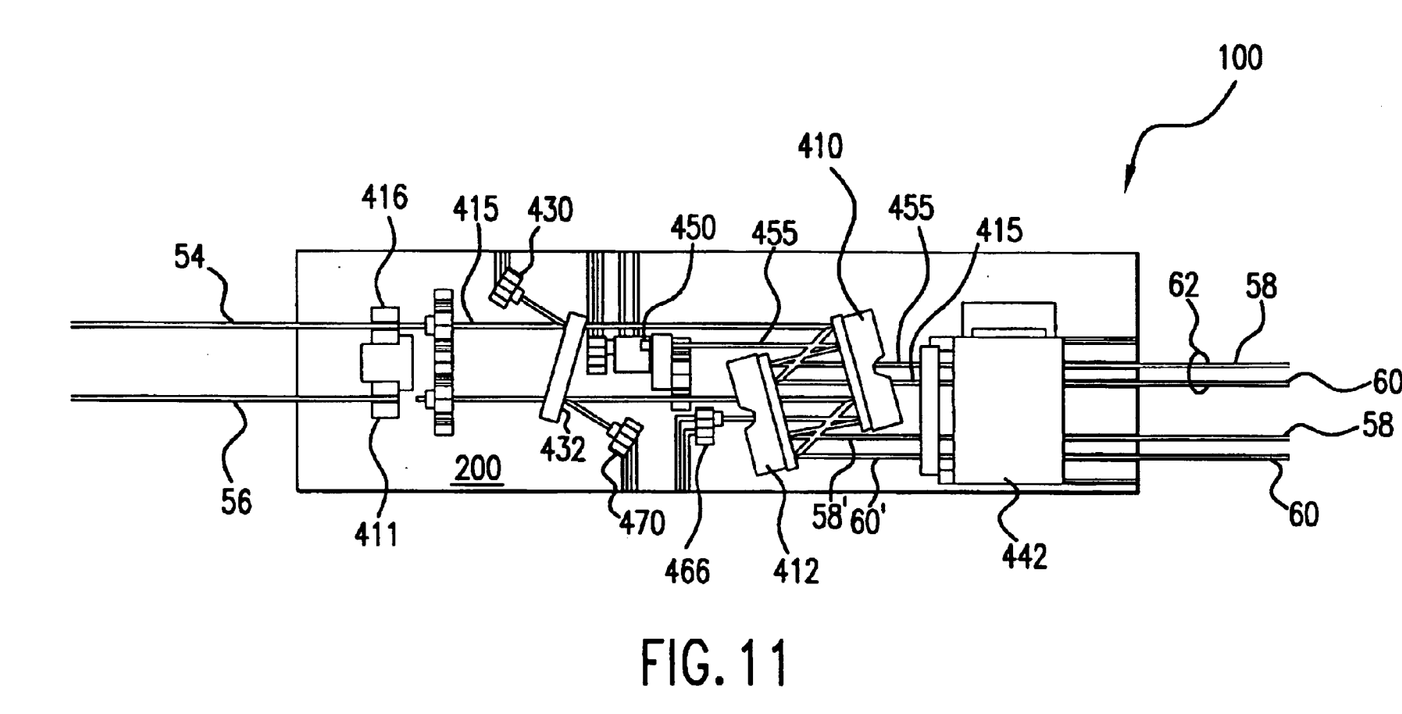
FIG. 11 is a top view of the second embodiment optical line card protection module with the switching system in a second state.

FIGS. 10 and 11 illustrate the two switching states of the system 100 shown in FIG. 9.

As illustrated in FIG. 10, beam 415, for example, is coupled into primary device input fiber 52, with monitoring beam 455 going to the redundant device input fiber 60. On the device output side, beam 58' from the primary device is transmitted to the user output fiber 56, whereas beam 60' from the redundant device is received by detector 466.

In contrast, in the second state illustrated in FIG. 11, input beam 415 is coupled into the input fiber 60 for the redundant device, with the primary device receiving monitoring signal beam 455. On the device output side, beam 60' from the primary device is transmitted to the user fiber 56, whereas beam 58' from the redundant device is received by detector 466.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical line card protection module, comprising:
   a bench;
   a user-side interface to an array of user fibers;
   a device-side interface to an array of device fibers that connect the module to a first device and a second device;
   a monitoring signal generator on the bench that generates monitoring signals;
   a monitoring signal detector on the bench that detects the monitoring signals; and
   a beam switching system on the bench that selectively connects the user fibers to the device fibers for the first device or the device fibers for the second device and the monitoring signal generator and the monitoring signal detector to the device fibers for the second device or the device fibers for the first device, respectively.

2. An optical line card protection module as claimed in claim 1, wherein the user-side interface and the device-side interface comprise separate fiber mounting blocks for respectively mounting fiber endfaces of the user fibers and endfaces of the device fibers to the bench.

3. An optical line card protection module as claimed in claim 1, further comprising a user-side lens array on the bench between fiber endfaces of the user fibers and the beam switching system.

4. An optical line card protection module as claimed in claim 1, further comprising a device-side lens array on the bench between fiber endfaces of the device fibers and the beam switching system.

5. An optical line card protection module as claimed in claim 1, wherein the monitoring signal generator comprises at least one semiconductor device mounted on the bench.

6. An optical line card protection module as claimed in claim 1, further comprising a generator lens array for directing monitoring signals from the semiconductor device to the beam switching system.

7. An optical line card protection module as claimed in claim 1, further comprising an input tap detector array that is located in a bean path between the user-side interface and the beam switching system for detecting optical signals that are input from the user fibers.

8. An optical line card protection module as claimed in claim 1, further comprising an output tap detector array that is located in a beam path between the user-side interface and the beam switching system for detecting optical signals that are being output to the user fibers.

9. An optical line card protection module as claimed in claim 1, wherein the beam switching system enables input beams from the user-side interface to be transmitted past the beam switching system in a first state and translates the input beams in a second state.

10. An optical line card protection module as claimed in claim 1, wherein the beam switching system enables output beams to the user-side interface to be transmitted past the beam switching system in a first state and translates the output beams in a second state.

11. An optical line card protection module as claimed in claim 1, wherein the beam switching system translates input beams from the user-side interface in a direction that is perpendicular to an axis of the input beams in response to converting between a first state and a second state.

12. An optical line card protection module as claimed in claim 1, wherein the beam switching system translates output beams to the user-side interface in a direction that is perpendicular to an axis of the output beams in response to converting between a first state and a second state.

13. An optical line card protection module as claimed in claim 1, wherein the beam switching system comprises two opposed tilt mirror arrays.

14. An optical line card protection module, comprising:
   a bench;
   a user-side interface to an array of user fibers;
   a device-side interface to an array of device fibers that connect the module to a primary device and a redundant device;
   a monitoring signal generator that generates a monitoring signal;
   a monitoring signal detector that detects the monitoring signal;
   a beam switching system on the bench that selectively connects the user fibers to the device fibers for the primary device or the device fibers for the redundant device and the monitoring signal generator and the monitoring signal detector to the device fibers for the redundant device or the device fibers for the primary device, respectively; and
   a user input signal tap detector that is located in a beam path between the user-side interface and the beam switching system for detecting optical signals that are input to the module from the user fibers.

15. An optical line card protection module, comprising:
   a bench;
   a user-side interface to an array of user fibers;

a device-side interface to an array of device fibers that connect the module to a primary device and a redundant device;

a monitoring signal generator that generates a monitoring signal;

a monitoring signal detector that detects the monitoring signal;

a beam switching system on the bench that selectively connects the user fibers to the device fibers for the primary device or the device fibers for the redundant device and the monitoring signal generator and the monitoring signal detector to the device fibers for the redundant device or the device fibers for the primary device, respectively; and a user output signal tap detector that is located in a beam path between the user-side interface and the beam switching system for detecting optical signals that are being output to the user fibers.

* * * * *